United States Patent Office 2,792,265
Patented May 14, 1957

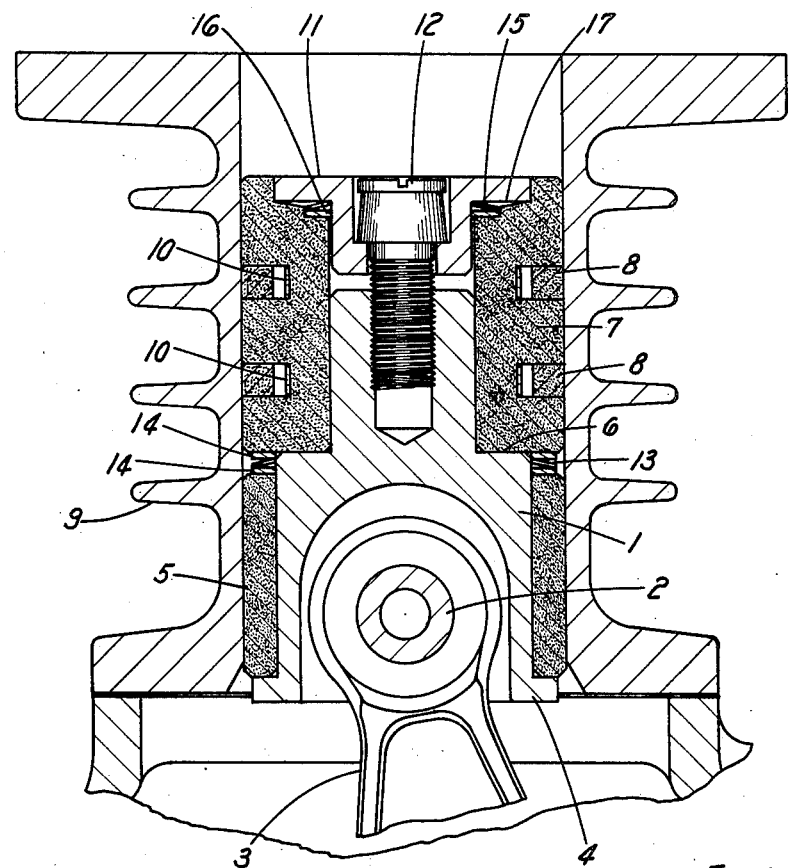
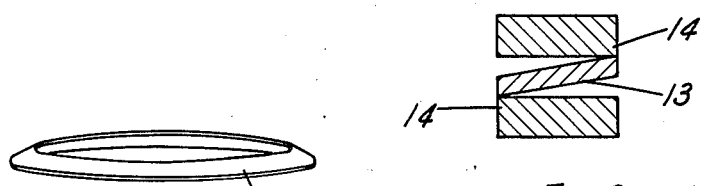
Fig. 1
Fig. 2
Fig. 3
INVENTOR.
ROYAL H. LILLEMAN
BY

2,792,265

PISTON CONSTRUCTION

Royal H. Lilleman, Quincy, Ill., assignor to Gardner-Denver Company, Quincy, Ill., a corporation of Delaware Application June 27, 1956, Serial No. 594,181

6 Claims. (Cl. 309—10)

This invention relates to pistons of the type used in compressors and pumps and more particularly to self-lubricating pistons for use in applications where it is necessary that the substance being pumped remain uncontaminated by lubricating oil. In these applications it is well known in the art to use a piston having its exterior elements and sealing rings, which contact the cylinder walls, made of carbon replacing the oil lubricated metal parts used in conventional machines. As carbon is self-lubricating, no oil is required in the cylinder ends of these machines. This type of compressor or pump is used in various industries such as food processing, chemical, brewing, plastics, distilling and in instrument control and paint spraying applications.

The carbon elements comprising the piston are removably supported by metallic core members of cast iron. In practice, it has been found that the metallic elements expand due to heat accumulating and becoming stored in the cylinder during operation of the machine while the non-metallic carbon elements are not so expanded. This expansion of the core members causes the carbon elements to loosen causing a slapping or knocking within the cylinder thereby increasing friction, wear, and possibly breaking the relatively brittle carbon elements.

It is an object of this invention to provide means for retaining the carbon elements of a carbon piston tightly against relative movement despite expansion of the metallic parts of the piston, thereby eliminating the difficulties created in present pistons of this type.

Other objects and features of this invention will become apparent from the following specification and drawing in which:

Fig. 1 is a transverse sectional view showing a piston incorporating the novel retaining means of this invention;

Fig. 2 is a perspective view of one of the spring elements used in the novel retaining means of this invention; and Fig. 3 is an enlarged view, in section, of the wear rings and spring element illustrated in Fig. 1.

Referring to the drawings, Fig. 1 illustrates a metal piston core 1 which may be made of cast iron, the major portion of which is provided with diametrically opposite holes for the reception of a transverse pin 2 forming a pivotal connection of the piston to the connecting rod 3 of a pump or compressor. Surrounding the lower portion of the piston core 1 and abutting an outwardly extending flange 4 of the core is a sleeve 5 of carbon or similar self-lubricating material. Surrounding the upper portion of the piston core 1 and abutting a shoulder 6 of the core is a carrier ring 7 also of carbon or similar self-lubricating material. The carrier ring is provided with a plurality of annular grooves about its periphery, within which are sealing rings 8 also of carbon or similar self-lubricating material. Each sealing ring comprises a plurality of overlapping segments of conventional type which are urged outwardly for sealing engagement with the inner wall of a cylinder 9 by conventional spring members 10. The sleeve 5 and carrier ring 7 are retained on the cylinder core 1 by means of a removable cap 11 which is retained centrally of the cylinder core by suitable means, here illustrated as a threaded bolt 12.

Disposed about the piston core 1 and separating the sleeve 5 and the carrier ring 7 is a frusto-conical spring member 13 (Fig. 2) positioned between two flat wear rings 14. A similar spring member 15 is disposed about the removable cap 11 separating the cap and the carrier ring 7, the spring member 15 bearing against a flat wear ring 16 adjacent the carrier ring 7.

It will be apparent that expansion of the metal piston core 1, removable cap 11 and retaining means 12 caused by heating of the cylinder end of the machine during operation thereof, will increase the over all dimensions of the piston core, increasing the space between the flange 4 of the piston core and inner face 17 of the removable cap. The spring members 13 and 15 serve to compensate for this expansion to hold the non-expanding carbon elements 5 and 7 against the flange 4 and shoulder 6 respectively.

It will be obvious to one skilled in the art that the structure described lends itself to additional variations in design which will fall within the scope of the invention claimed.

I claim as my invention:

1. A piston comprising a metallic body having an outwardly extending annular flange at one end thereof; a carbon sleeve disposed about a part of said body and supported by said flange; a carbon ring disposed about the remainder of said piston body and abutting a shoulder on said piston body; an annular frusto-conical spring between the sleeve and ring; a plurality of peripheral annular grooves formed on said ring; segmental carbon sealing elements within said grooves; a metallic cap removably connected to said piston body; a second annular frusto-conical spring between said cap and said ring; said first spring being adapted to maintain said sleeve against said flange during expansion of said piston body and said second spring being adapted to maintain said ring against said shoulder during expansion of said piston body.

2. A piston comprising a body; a carbon sleeve disposed about a part of said body; a carbon ring disposed about the remainder of said body, said ring having a peripheral annular groove; a segmental carbon sealing element within said groove; a cap forming a part of said body to retain said sleeve and ring on said body; a frusto-conical annular spring between said sleeve and said ring; a second frusto-conical annular spring between said cap and said ring; said springs serving to hold said sleeve and ring in rigid axial alignment during lineal elongation of said piston body.

3. A piston comprising a metallic body; non-metallic elements disposed about said body; a metallic cap connected to said body to retain said non-metallic elements on said body; an annular frusto-conical spring disposed about said body between said cap and said non-metallic elements maintaining said elements in fixed relationship to said body despite lineal expansion and contraction of said body.

4. A piston comprising a core; a self-lubricating element disposed about said core and having a peripheral annular groove; self-lubricating sealing means within said groove; means for retaining said element on said core; means between said core and said element holding the carbon elements against relative movement with respect to said core.

5. A piston comprising a metal body; a self-lubricating element disposed about said body; means for retaining said element on said body including resilient means adapted to prevent lineal motion of said element on said body during elongation of said body due to expansion of said body.

6. A piston comprising a metallic body; a non-metallic element disposed about said body; means for retaining said element on said body; and resilient means disposed about said body adapted to maintain said element in fixed relationship to said body.

No references cited.